United States Patent
Schwarz et al.

(10) Patent No.: US 11,408,319 B2
(45) Date of Patent: Aug. 9, 2022

(54) METHOD AND INTERNAL COMBUSTION ENGINE FOR IMPROVING THE EFFICIENCY OF AN SCR SYSTEM

(71) Applicant: AVL List GmbH, Graz (AT)

(72) Inventors: Christina Schwarz, Graz (AT); Bas Vos, Graz (AT); Mario De Monte, Birkfeld (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 17/270,474

(22) PCT Filed: Aug. 23, 2019

(86) PCT No.: PCT/AT2019/060267
§ 371 (c)(1),
(2) Date: Feb. 23, 2021

(87) PCT Pub. No.: WO2020/037346
PCT Pub. Date: Feb. 27, 2020

(65) Prior Publication Data
US 2021/0270167 A1    Sep. 2, 2021

(30) Foreign Application Priority Data
Aug. 23, 2018    (AT) .............................. A 50718/2018

(51) Int. Cl.
*F01N 3/20* (2006.01)
*B01D 53/94* (2006.01)

(52) U.S. Cl.
CPC ......... *F01N 3/208* (2013.01); *B01D 53/9418* (2013.01); *B01D 53/9495* (2013.01);
(Continued)

(58) Field of Classification Search
CPC combination set(s) only.
See application file for complete search history.

(56) References Cited

U.S. PATENT DOCUMENTS

| 7,858,060 | B2 * | 12/2010 | Gady | ................. | B01D 53/9409 |
| | | | | | 423/213.5 |
| 8,453,434 | B2 * | 6/2013 | Yacoub | ................... | F01N 3/208 |
| | | | | | 60/286 |

(Continued)

FOREIGN PATENT DOCUMENTS

| CN | 101900025 | 12/2010 |
| CN | 104975914 | 10/2015 |

(Continued)

OTHER PUBLICATIONS

Internationaler Recherchenbericht und Schriftlicher Bescheid [International Search Report and the Written Opinion] dated Oct. 8, 2019 From the International Searching Authority Re. Application No. PCT/AT2019/060267 and Its Translation of Search Report Into English.

*Primary Examiner* — Binh Q Tran (57) ABSTRACT

The invention relates to a method for improving the efficiency of an SCR system of an exhaust gas aftertreatment system (5) of an internal combustion engine (1), and to an internal combustion engine (1), wherein an operating medium is metered in upstream of the SCR catalytic converter (2) of the SCR system in a normal operating mode, wherein the operating medium comprises a reducing agent or can be converted into a reducing agent, wherein the reducing agent is stored at least temporarily in an SCR catalytic converter (2) of the SCR system, wherein the method comprises the following steps: operating of the internal combustion engine (1) in the normal operating mode, defining of a determined control value (6) by way of determining of the mass of an exhaust gas component which is measured overall at a point in the course of the exhaust gas aftertreatment system (5) during a first measurement window, determining of a calculated control value (7) by way of calculating of the mass of the exhaust gas component which (Continued)

occurs overall at the point in the course of the exhaust gas aftertreatment system (5) during the first measurement window, determining of the deviation (8) between the determined control value and the calculated control value, checking whether the determined deviation lies within a predefined deviation range, adapting of the metering quantity of the operating medium if the determined deviation lies outside the deviation range.

18 Claims, 1 Drawing Sheet

(52) U.S. Cl.
CPC ...... *F01N 2610/02* (2013.01); *F01N 2900/08* (2013.01); *F01N 2900/1402* (2013.01); *F01N 2900/1411* (2013.01); *F01N 2900/1616* (2013.01)

(56) References Cited

U.S. PATENT DOCUMENTS

| | | | |
|---|---|---|---|
| 2009/0301066 A1* | 12/2009 | Sindano | F02D 41/1462 60/286 |
| 2010/0028230 A1 | 2/2010 | Gady et al. | |
| 2010/0050611 A1* | 3/2010 | Walz | F01N 3/208 60/286 |
| 2012/0060469 A1 | 3/2012 | Gady et al. | |
| 2014/0033682 A1 | 2/2014 | Schweizer | |
| 2015/0218993 A1* | 8/2015 | Chavannavar | F01N 3/208 423/239.1 |
| 2018/0008932 A1* | 1/2018 | Quigley | F01N 3/208 |

FOREIGN PATENT DOCUMENTS

| | | |
|---|---|---|
| EP | 2181756 | 5/2010 |
| WO | WO 2020/037346 | 2/2020 |

\* cited by examiner

METHOD AND INTERNAL COMBUSTION ENGINE FOR IMPROVING THE EFFICIENCY OF AN SCR SYSTEM

RELATED APPLICATIONS

This application is a National Phase of PCT Patent Application No. PCT/AT2019/060267 having International filing date of Aug. 23, 2019, which claims the benefit of priority of Austrian Patent Application No. A50718/2018 filed on Aug. 23, 2018. The contents of the above applications are all incorporated by reference as if fully set forth herein in their entirety.

FIELD AND BACKGROUND OF THE INVENTION

The invention relates to a method and an internal combustion engine according to the preambles of the independent claims.

In order to model the emissions of motor vehicles, in conventional methods physical, in particular kinetic, models are used. In these conventional methods, the modelled $NH_3$ loading of the SCR catalytic converter generally serves to control the injection quantity of operating medium in order to achieve the goals of emission legislation.

The efficiency of the SCR catalytic converter can decrease over the course of time due to environmental influences, deposits, sulphur poisoning or sensor inaccuracies. Furthermore, the demanded injection quantity can also deviate from the truly quantity of operating medium actually metered. Numerous different methods are known from the prior art in order to enable the metering quantity to be adjusted despite such deviations.

For example, methods are known in which the modelled loading quantity of an SCR catalytic converter is adapted if the modelled and measured emissions differ from one another. Furthermore, methods are known in which the metering quantity of operating medium is varied in a defined manner in particular operating phases and the presence of NOx and/or $NH_3$ slip can be concluded from the degree of correspondence between the expected value and the actual value determined by means of the NOx sensor and the metering quantity adapted.

SUMMARY OF THE INVENTION

The object of the invention is to overcome the disadvantages of the prior art.

In particular, it is the object of the invention to create a method for improving the efficiency of an SCR system with which the metering quantity of operating medium can be optimally adjusted. Furthermore, it is a further object of the invention to make possible higher NOx conversion rates, to reduce the operating medium consumption and/or reduce the reducing agent slip, as a result of which legal requirements can be complied with and in particular surpassed.

The object of the invention is in particular achieved through the features of the independent claims.

The invention relates to a method for improving the efficiency of an SCR system of an exhaust gas aftertreatment system of an internal combustion engine, in particular taking into consideration the cross-sensitivity of an NOx sensor to $NH_3$, whereby an operating medium is metered upstream of the SCR catalytic converter of the SCR system in a normal operating mode which corresponds to its intended operation, whereby the operating medium contains a reducing agent or can be converted into a reducing agent and whereby the reducing agent is stored at least temporarily in an SCR catalytic converter of the SCR system.

According to the invention, the method comprises the following steps:

operating the internal combustion engine in the normal operating mode, defining a determined control value by way of determining the mass of an exhaust gas component, in particular the emission recorded by an NOx sensor, which is measured overall at a point in the course of the exhaust gas aftertreatment system during a first measurement window, determining a calculated control value by way of calculating the mass of the exhaust gas component, in particular the NOx emissions, which occurs overall at the point in the course of the exhaust gas aftertreatment system during the first measurement window, determining the deviation between the determined control value and the calculated control value, checking whether the determined deviation lies within a predefined deviation range, adapting the metering quantity of the operating medium if the determined deviation lies outside of the deviation range.

A correction of an injection quantity is thus based on a logic which examines a value of the NOx sensor. This evaluation is based on several evaluation cycles, thus making the function more stable.

Optionally, in the normal operating mode, in particular in the intended operation, an operating medium suitable for selective catalytic reduction such as, in particular, a urea-containing mixture, a urea solution or AdBlue®, is metered upstream of the SCR system. The operating medium can contain a reducing agent such as, in particular, ammonia $NH_3$, or can be convertible into a reducing agent such as, in particular, $NH_3$. Preferably, a urea-containing mixture, in particular a urea-water solution, for example AdBlue®, is used as operating medium, whereby the operating medium is, optionally, converted into the reducing agent, in particular $NH_3$, by way of the reactions represented below:

Thermolysis: $(NH_2)_2CO \rightarrow NH_3 + HNCO$

Hydrolysis: $HNCO + H_2O \rightarrow NH_3 + CO_2$

In a first step, in the case of the thermolysis reaction the urea $(NH_2)_2CO$ can be converted into ammonia $NH_3$ and isocyanic acid HNCO. In a second step, in the case of the hydrolysis reaction the isocyanic acid HNCO can be converted, with water $H_2O$, into ammonia $NH_3$ and carbon dioxide $CO_2$.

The reducing agent, in particular $NH_3$, can be and/or is, optionally, stored at least temporarily in the SCR catalytic converter. Optionally, the ammonia is deposited on the active centres of the SCR catalytic converter. The at least temporarily stored reducing agent, in particular the ammonia $NH_3$, can then reduce nitrogen oxides NOx such as, in particular, nitrogen monoxide NO and nitrogen dioxide $NO_2$.

The metering of the operating medium can be effected by means of a metering device, in particular via an injector or via an injection nozzle. The metering quantity of the operating medium in the normal operating mode, the so-called normal operating mode metering quantity, can be defined previously, for example during the course of calibration of the internal combustion engine and/or of the exhaust gas aftertreatment system, depending on the NOx emissions occurring, and, optionally, further operating parameters can be defined, or can be defined in a characteristic diagram.

In order to define the determined control value, the mass of an exhaust gas component which is measured overall at a point in the course of the exhaust gas aftertreatment system can be determined during the measurement window.

In order to determine the calculated control value, the mass of an exhaust gas component which occurs overall at a point in the course of the exhaust gas aftertreatment system can be calculated during the measurement window.

It can be favourable if the measurement window is defined as a duration which is to be achieved. It can thereby be the case that the measurement window can be rejected if stationary operation ends before the defined duration is achieved.

Within the context of the present disclosure, a point in the course of the exhaust gas aftertreatment system is understood to mean a position downstream of the engine of the internal combustion engine, in particular downstream of the SCR system, preferably downstream of the SCR catalytic converter.

The determined control value and the calculated control value are defined at the same point in the course of the exhaust gas aftertreatment system.

The determined control value can then be compared with the calculated control value. The deviation between the determined control value and the calculated control value can thereby be determined.

It is then checked whether the determined deviation lies within a predefined deviation range.

Checking whether the determined deviation lies within a predefined deviation range allows a statement to be made as to the extent to which the determined control value deviates from the calculated control value. This makes it possible to determine, optionally, whether the mass of the exhaust gas component which occurs overall lies within a setpoint range or within the deviation range. The metering quantity of the operating medium can be adapted if the mass of the exhaust gas component which occurs overall lies outside of the setpoint range and can remain unchanged if the mass of the exhaust gas component which occurs overall lies within the setpoint range.

It can also be the case that the calculated control value is a minimal NOx mass, which, if this value is not reached, means that emissions lie within the legal limit and an injection does not need to be changed. It is thus checked whether the control value is fallen short of. The control value can thus be a minimal mass of NOx over this measurement window, whereby its is determined whether a determined NOx value has increased or decreased.

The internal combustion engine can be an internal combustion engine of a motor vehicle.

Optionally, the method is carried out in an automated manner, in particular in a control device of a motor vehicle and/or controlled and/or regulated by a control device of a motor vehicle.

Optionally, the method steps of the method, as described above, are carried out in succession. That is to say, optionally, that a determined control value and a calculated control value are first determined. The deviation between the determined control value and the calculated control value is then determined and it is checked whether the determined deviation lies within a predefined deviation range. If the determined deviation lies outside of the deviation range, the metering quantity of the operating medium is, if necessary, adapted.

Optionally, at least one further determined control value is determined during at least one further measurement window, at least one further calculated control value is calculated during the at least one further measurement window calculated, the deviation between the further determined control value and the further calculated control value is determined, it is checked whether the determined deviation les within the, or a, predefined deviation range, and the metering quantity of the operating medium is adapted if the determined deviation lies outside of the deviation range.

In order to check the effect of the adaptation of the metering quantity, a further determined control value can be determined and a further calculated control value calculated in a further measurement window.

The further determined control value can be determined by determining the mass of the exhaust gas component, in particular the emissions measured by means of an NOx sensor, measured overall in the course of the exhaust gas aftertreatment system during the further measurement window.

The further calculated control value can be determined by calculating the mass of the exhaust gas component, in particular the NOx emissions, measured overall in the course of the exhaust gas aftertreatment system during the further measurement window.

Optionally, the further determined control value and the further calculated control value of the further measurement window are determined at the same point in the course of the exhaust gas aftertreatment system as the determined and calculated control values of the preceding measurement window. That is to say, optionally, that the control values of each measurement window are determined at the same point in the course of the exhaust gas aftertreatment system.

The deviation between the further determined control value and the further calculated control value is then determined and it is checked whether the determined deviation lies within the, or a, predefined deviation range.

If the determined deviation lies outside of the deviation range, the metering quantity is adapted. If the determined deviation lies within the deviation range, the metering quantity remains unchanged.

Optionally, each of the determined control values is formed from the measured values of a sensor, in particular of an NOx sensor downstream of the SCR system.

That is to say that, optionally, the determined control value or the further determined control values is or are based on measured values of a sensor. Each of the determined control values can for example be formed or determined through integration of the emissions measured by means of an NOx sensor downstream of the SCR catalytic converter during the respective measurement window. In other words, the determined control value is based on measured values of a sensor or is formed from measured values.

The sensor is preferably designed as an NOx sensor and is arranged downstream of the SCR system. Since conventional NOx sensors are as a rule cross-sensitive to $NH_3$ emissions, with conventional NOx sensors $NH_3$ emissions downstream of the SCR catalytic converter are falsely detected as NOx emissions. Due to the cross-sensitivity of the NOx sensor, an $NH_3$ slip can lead to a higher NOx measured value of the NOx sensor.

Optionally, the reactions, relevant for the method, of the SCR system, in particular of the SCR catalytic converter, can, in addition to real operation, be calculated in a kinetic model, whereby the kinetic model corresponds in particular to a mathematical model of the physical model of the SCR system used.

Optionally, each of the calculated control values is calculated with a model, in particular with the kinetic model, or each of the calculated control values is calculated from a characteristic diagram based on test bench data.

Optionally, the relevant reactions are represented mathematically-physically through the kinetic model. The reactions can thus be based on physical conditions, which means that estimates and/or uncertainties can be reduced and the accuracy of the modelled values increased.

For example, with the kinetic model the oxidation of the reducing agent, in particular the oxidation of $NH_3$, can also be modelled. In conventional methods and/or conventional models, if this is taken into consideration the oxidation of reducing agent can in most cases only be estimated, which involves great uncertainties or is very inaccurate. Such a kinetic model is for example disclosed in "Hollauf, Bernd: Model-Based Closed-Loop Control of SCR Based DeNOx Systems. Master's thesis, University of Applied Science Technikum Karnten, 2009."

Optionally, each calculated control value is calculated using a model, in particular a kinetic model. The deviation can be determined or calculated through comparison of the determined control value with the control value calculated using the kinetic model of the SCR catalytic converter. If the determined or calculated deviation lies outside of the deviation range, the metering quantity is changed. This allows the metering quantity to be adjusted such that an optimum is achieved between NOx conversion and operating medium consumption. In other words, the metering quantity can be adjusted such that the greatest possible NOx conversion can be achieved with the lowest possible consumption of operating medium. In particular, the real SCR system is adapted to the SCR system modelled using the kinetic model through the adaptation of the metering quantity.

Optionally, each of the calculated control values is calculated from a characteristic diagram based on test bench data. In a preferred embodiment, the calculated control value can also correspond to a value defined previously through calculation or a calculated value from a characteristic diagram. As a result, the adjustment of the metering quantity can depend, in particular exclusively, on the measured NOx emissions downstream of the SCR catalytic converter and on the test bench data or the predefined value. This means the adjustment of the metering quantity can be independent of the, in particular kinetic, model, as a result of which the adjustment of the metering quantity is uninfluenced by inaccuracies of the model.

Optionally, the normal operating mode comprises a stationary and/or a transient or non-stationary operation of the internal combustion engine and/or the exhaust gas aftertreatment system.

Optionally, the deviation between the determined control value and the calculated control value is determined according to the following rule:

$$\text{Deviation} = \frac{\text{control value}_{determined}}{\text{control value}_{calculated}}$$

where the deviation is the determined deviation, where control value$_{determined}$ is the determined control value, and where control value$_{calculated}$ is the calculated control value.

Optionally, the deviation is determined through comparison of the determined control value with the calculated control value, whereby the metering quantity of the operating medium remains unchanged if the determined control value is less than the calculated control value, and whereby the metering quantity of the operating medium is adapted if the determined control value is greater than the calculated control value.

The calculated control value can be a most readily achievable, in particular minimal NOx mass during each measurement window. Optionally, if the determined control value falls below this calculated control value, the operating medium quantity remains unchanged or no adaptation of the operating medium quantity takes place. In this case it can be assumed that the SCR system, in particular the SCR catalytic converter, is functioning as effectively as possible or with the greatest possible efficiency. In other words, in this case the SCR system, in particular the SCR catalytic converter, is at an economical, in particular optimal, operating point.

If the determined control value exceeds the calculated control value, the metering quantity of operating medium can be adapted.

Optionally, each measurement window is defined by the reaching of the energy quantity converted by the internal combustion engine, whereby each measurement window begins at a starting point and ends at an end point when a particular calculated energy quantity is reached, or each measurement window is defined by a duration of a continuously stationary operation of the internal combustion engine, whereby each measurement window begins when the internal combustion engine is in stationary operation and ends before the internal combustion engine enters non-stationary or transient operation and/or a predefined duration has been reached.

Alternatively or in addition, it can also be the case that each measurement window ends if the internal combustion engine has been operated for a predefined duration at a stationary operating point.

At the beginning of the method, the measurement window length can be determined by defining an energy quantity converted by the internal combustion engine. The measurement window begins at a starting point and ends at an end point on reaching the predefined converted energy quantity. For this purpose, optionally, the engine power is integrated during the measurement, in particular during the measurement window, for as long as the predefined energy quantity has not yet been reached. This means the engine power can be integrated over the entire measurement window length. As soon as the predefined energy quantity is reached, the measurement window can end at an end point. The measurement window length can thus correspond to a predefined energy quantity, in particular 0.5 kWh to 100 kWh, in particular 1 kWh to 80 kWh, preferably 2 kWh to 60 kWh, particularly preferably around 2 kWh. This means a measurement window can be recorded during the stationary and/or non-stationary operation of the internal combustion engine. According to a preferred embodiment, the measurement window length or the duration of a measurement window depends on the converted energy quantity and is in particular defined by the work output by the internal combustion engine.

Optionally, the measurement window can be defined by a stationary operation of the internal combustion engine. That is to say, optionally, the determined control value and the calculated control value are determined during the stationary operation of the internal combustion engine. In particular, the determination of the control values takes place within the stationary operation of the internal combustion engine. This means that a measurement window can be recorded during the in particular exclusively stationary operation of the internal combustion engine. According to a preferred embodiment, the measurement window length or the duration of a measurement window depends on the operating conditions of the internal combustion engine and a predefined duration, and is in particular time-based.

Optionally, the energy quantity converted by the internal combustion engine is determined from a characteristic diagram of the operating point of the internal combustion engine, the energy quantity converted by the internal combustion engine is calculated from the rotational speed of the internal combustion engine, in particular the engine speed NEng, and the injected fuel quantity MfFullnj, and/or the energy quantity converted by the internal combustion engine is calculated according to the following rule:

$$EEng = \int PwrEng$$
$$PwrEng = \frac{2 \cdot \pi \cdot NEng \cdot TqEng}{60 \cdot 1000}$$

where EEng is the energy quantity converted by the internal combustion engine during a measurement window, where PwrEng is the engine power, where NEng is the engine speed, and where TqEng is the engine torque.

The power of the internal combustion engine can either be calculated or predefined or determined from a characteristic diagram of the operating point of the internal combustion engine.

Optionally, the validity of each recorded measurement window is evaluated taking into consideration at least one validity parameter.

Optionally, the measurement window is defined as valid if the at least one validity parameter lies within a validity range for a certain duration during the measurement window, and/or the measurement window is defined as invalid if the at least one validity parameter lies outside of a validity range for a certain duration during the measurement window, and/or the measurement window is defined as invalid if a predetermined number of times when the validity range is exceeded or fallen short of and/or infringed is exceeded.

At least one validity parameter is applied in order to evaluate the validity of the measurement window.

Optionally, the average SCR catalytic converter temperature, the stored quantity of reducing agent, in particular the stored quantity of $NH_3$, in the SCR catalytic converter and/or in the SCR model, the NOx concentration upstream of the SCR system, in particular the NOx concentration upstream of the SCR catalytic converter, and/or the like can also be applied as validity parameters.

For example, parameters such as the engine speed, the injected fuel quantity, the engine torque, the calculated engine power or the like can be applied as validity parameters. The measurement window can for example be invalid if the calculated engine power is transient, in particular highly transient, and as a result the at least one validity parameter does not lie within the defined validity range for the predefined duration.

This means that a measurement window can also be defined as valid if the at least one validity parameter lies outside of the validity range a couple of times and/or the at least one validity parameter lies outside of the validity range for a certain duration. Optionally, a measurement window is defined as invalid if a number of predetermined validity range infringements or times when the validity range is exceeded and/or fallen short of has been exceeded. Optionally, it is defined that, if a validity parameter falls below or exceeds the validity range during a measurement window, this constitutes a validity range infringement.

Optionally, if the determined deviation of the first measurement window lies outside of the deviation range, the metering quantity is increased in comparison with the metering quantity in the normal operating mode, so that an adapted metering quantity is metered thereafter.

Optionally, in a first step the metering quantity of the operating medium is increased in comparison with the metering quantity in the normal operating mode if the determined deviation between the determined control value and the calculated control value, in particular calculated with the kinetic model, of the first measurement window lies outside of the deviation range.

Optionally, NOx slip is detected if the determined deviation of the further measurement window is less than the determined deviation of the preceding measurement window and if, in the preceding measurement window, the metering quantity has been increased, either in comparison with the metering quantity in the normal operating mode or in comparison with the adapted metering quantity, whereby, if NOx slip is detected, the metering quantity of operating medium is increased, or $NH_3$ slip is detected if the determined deviation of the further measurement window is greater than the determined deviation of the preceding measurement window and if, in the preceding measurement window, the metering quantity has been increased, either in comparison with the metering quantity in the normal operating mode or in comparison with the adapted metering quantity, whereby, if $NH_3$ slip is detected, the metering quantity of operating medium is reduced.

In the case that, in the preceding measurement window or in the preceding step, the metering quantity was increased in comparison with the metering quantity in the normal operating mode or in comparison with the adapted metering quantity, NOx slip can be detected if the determined or calculated deviation of the further measurement window is less than the determined or calculated deviation of the preceding measurement window. In particular, in this case the metering quantity is increased if NOx slip is detected.

In the case that, in the preceding measurement window or in the preceding step, the metering quantity was increased in comparison with the metering quantity in the normal operating mode or in comparison with the adapted metering quantity, $NH_3$ slip can be detected if the determined or calculated deviation of the further measurement window is greater than the determined or calculated deviation of the preceding measurement window. In particular, in this case the metering quantity is reduced if $NH_3$ slip is detected.

Optionally, NOx slip is detected if the determined deviation of the further measurement window is greater than the determined deviation of the preceding measurement window and if, in the preceding measurement window, the metering quantity has been reduced either in comparison with the metering quantity in the normal operating mode or in comparison with the adapted metering quantity, whereby, if NOx slip is detected, the metering quantity of operating medium is increased, $NH_3$ slip is detected if the determined deviation of the further measurement window is less than the determined deviation of the preceding measurement window and if, in the preceding measurement window, the metering quantity has been reduced, either in comparison with the metering quantity in the normal operating mode or in comparison with the adapted metering quantity, whereby, if $NH_3$ slip is detected, the metering quantity of operating medium is reduced.

In the case that, in the preceding measurement window or in the preceding step, the metering quantity was reduced in comparison with the metering quantity in the normal operating mode or in comparison with the adapted metering quantity, NOx slip can be detected if the determined or calculated deviation of the further measurement window is greater than the determined or calculated deviation of the preceding measurement window. In particular, in this case the metering quantity is increased if NOx slip is detected.

In the case that, in the preceding measurement window or in the preceding step, the metering quantity was reduced in comparison with the metering quantity in the normal operating mode or in comparison with the adapted metering quantity, $NH_3$ slip can be detected if the determined or calculated deviation of the further measurement window less than the determined or calculated deviation of the preceding measurement window. In particular, in this case the metering quantity is reduced, if $NH_3$ slip is detected.

Optionally, NOx slip is detected if the further determined control value of the further measurement window is less than the determined control value of the preceding measurement window and if, in the preceding measurement window, the metering quantity has been increased either in comparison with the metering quantity in the normal operating mode or in comparison with the adapted metering quantity, whereby, if NOx slip is detected, the metering quantity of operating medium is increased, or $NH_3$ slip is detected if the further determined control value of the further measurement window is greater than the determined control value of the preceding measurement window and if, in the preceding measurement window, the metering quantity has been increased, either in comparison with the metering quantity in the normal operating mode or in comparison with the adapted metering quantity, whereby, if $NH_3$ slip is detected, the metering quantity of operating medium is reduced.

The metering quantity of the operating medium can be adapted through the comparison of the determined control values of the further measurement window with the determined control value of the preceding measurement window. In other words, only the NOx mass of the further measurement window measured with the NOx sensor can hereby be compared with the NOx mass of the preceding measurement window measured with the NOx sensor.

Optionally, NOx slip is detected if the further determined control value of the further measurement window is greater than the determined control value of the preceding measurement window and if, in the preceding measurement window, the metering quantity has been reduced, either in comparison with the metering quantity in the normal operating mode or in comparison with the adapted metering quantity, whereby, if NOx slip is detected, the metering quantity of operating medium is increased, $NH_3$ slip is detected if the further determined control value of the further measurement window is less than the determined control value of the preceding measurement window and if, in the preceding measurement window, the metering quantity has been reduced, either in comparison with the metering quantity in the normal operating mode or in comparison with the adapted metering quantity, whereby, if $NH_3$ slip is detected, the metering quantity of operating medium is reduced.

In a method according to the invention, a function is described the validity range of which is not limited to a single load point. In addition, it is possible in this way to detect an NOx slip (a poor conversion efficiency) and also $NH_3$ slip and adapt a metering quantity based on these results.

A calculation of the required $NH_3$ injection quantity is based in particular on the NOx emissions upstream of the SCR and the modelled SCR loading which are predicted through a kinetic model, and on the fact that an NOx mass downstream of the SCR is not taken into consideration.

The metering quantity of the operating medium can be adapted through the comparison of the determined control value of the further measurement window with the determined control value of the preceding measurement window. In other words, only the NOx mass of the further measurement window measured with the NOx sensor can hereby be compared with the NOx mass of the preceding measurement window measured with the NOx sensor.

Optionally, the metering quantity is adapted by an adaptation factor, whereby the adaptation factor is a predefined value, or whereby the adaptation factor is dependent on the determined deviation.

Optionally, the metering quantity is adapted with an adaption factor in comparison with the metering quantity in the normal operating mode or in comparison with an already adapted metering quantity. In particular, in order to adapt the metering quantity the metering quantity in the normal operating mode or an already adapted metering quantity can be multiplied by the adaptation factor.

It can also be favourable if the adaptation factor is dependent on the operating point of the internal combustion engine.

The adaptation factor can be dependent on the determined deviation or the numerical value of the determined deviation. In other words, the adaptation factor can correspond to the numerical value of the determined deviation, whereby the adaptation factor is large if the determined deviation is large, or whereby the adaptation factor is small if the determined deviation is small. In order to the achieve the goal that the determined deviation should lie within a predefined deviation range more quickly, in the case of a large determined deviation a correspondingly large adaptation factor can be selected.

In particular, the method according to the invention thus does not interfere with the operating parameters of the engine. The method according to the invention relates in particular purely to an adaptation function for an SCR system, with an NOx sensor in each case upstream of and downstream of the catalytic converter. The $NH_3$ injection quantity upstream of the SCR is adapted. Measured emissions are preferably checked over one or more measurement windows and on this basis it is then decided whether an adaptation is necessary and/or whether an $NH_3$ slip and/or NOx slip is present.

In particular, the invention relates to an internal combustion engine comprising an exhaust gas aftertreatment system with an SCR system, whereby the internal combustion engine is configured and/or suitable for carrying out the method according to the invention.

Further features according to the invention are disclosed, optionally, in the claims, the description of the exemplary embodiments and the figures.

BRIEF DESCRIPTION OF THE SEVERAL VIEWS OF THE DRAWINGS

The invention is now explained further with reference to exemplary, non-exclusive and/or non-limiting exemplary embodiments.

DESCRIPTION OF SPECIFIC EMBODIMENTS OF THE INVENTION

Figure 1:
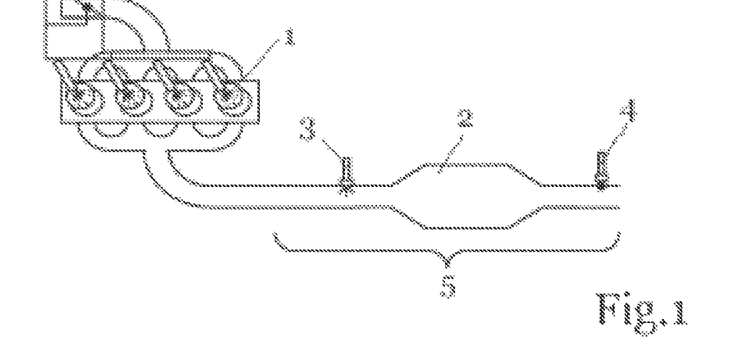
FIG. 1 shows a schematic graphic representation of a first embodiment of an internal combustion engine according to the invention which is configured and/or suitable for carrying out the method according to the invention.
Figure 2:
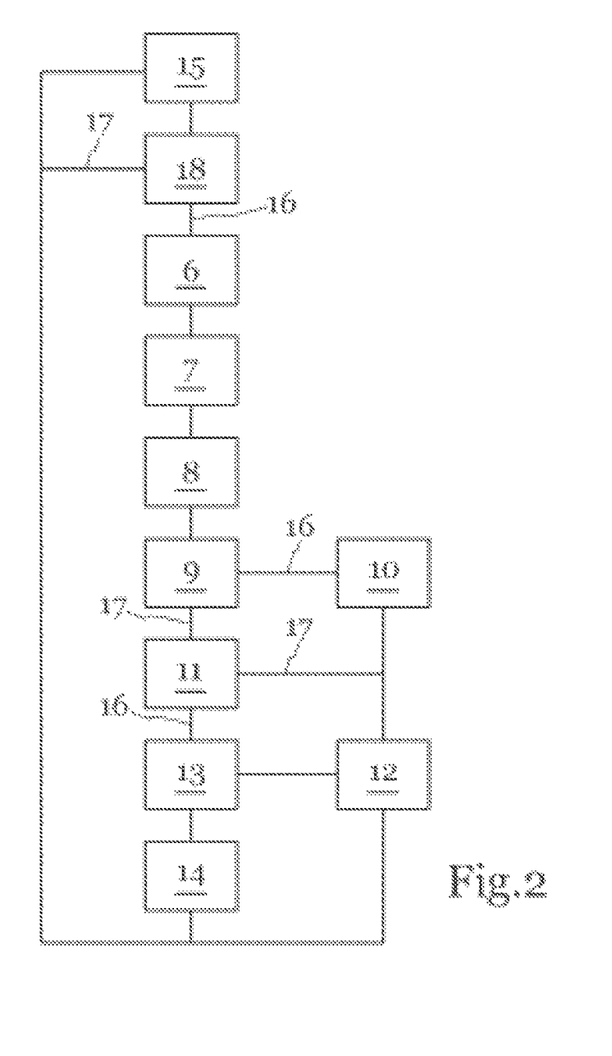
FIG. 2 shows a schematic flow chart of two variants of a first embodiment of the method according to the invention.

Unless otherwise stated, the reference symbols correspond to the following components or method steps:

Internal combustion engine 1, SCR catalytic converter 2, metering device 3, NOx sensor 4, exhaust gas aftertreatment system 5, determining a determined control value 6, determining a calculated control value 7, determining the deviation 8, checking whether the determined deviation lies within a predefined deviation range 9, maintenance of the metering quantity 10, adaptation of the metering quantity in a preceding measurement window already carried out 11, increase in the metering quantity 12, decision logic 13, reduction in the metering quantity 14, recording of a measurement window 15, yes 16, no 17, and validity check 18.

FIG. 1 shows a schematic graphic representation of a first embodiment of an internal combustion engine 1 according to the invention which is configured and/or suitable for carrying out the method according to the invention.

The embodiment comprises an internal combustion engine 1 and an exhaust gas aftertreatment system 5. The exhaust gas aftertreatment system 5 comprises a metering device 3, an SCR catalytic converter 2 and an NOx sensor 4.

The exhaust gas aftertreatment system 5 can for example comprise further exhaust gas aftertreatment components, such as a diesel oxidation catalyst DOC, an NOx storage catalyst NSC, a diesel particle filter DPF and/or an ammonia slip catalyst ASC.

In the normal operating mode, which corresponds to intended operation, an operating medium is metered upstream of the SCR catalytic converter 2. The operating medium contains a reducing agent or can be converted into a reducing agent. The reducing agent, in particular the ammonia $NH_3$, is stored at least temporarily in the SCR catalytic converter 2.

FIG. 2 shows a schematic flow chart of variants of a first embodiment of the method according to the invention.

According to this flow chart, at the beginning of the method a measurement window is recorded. The measurement window can be defined, in a first variant of the first embodiment, through the stationary operation of the internal combustion engine 1 or, in a second variant of the first embodiment, through reaching of the energy quantity converted by the internal combustion engine 1.

The validity of the measurement window is then checked. According to this embodiment, the measurement window is evaluated as invalid if a validity parameter, for example the average SCR catalytic converter temperature, the stored quantity of reducing agent or the NOx concentration upstream of the SCR catalytic converter, lies outside of a predefined validity range for a certain duration during the measurement window.

If the measurement window is evaluated as valid, a determined control value and a calculated control value are determined during the measurement window. The determined control value is defined by determining the mass of an exhaust gas component, in particular the emissions recorded by an NOx sensor, which is measured overall at a point in the course of the exhaust gas aftertreatment system 5 during the measurement window. The calculated control value is determined by calculating the mass of the exhaust gas component, in particular the NOx emissions, which occurs overall at the point in the course of the exhaust gas aftertreatment system during the measurement window.

In a first variant of the first embodiment, after determining the calculated control values 7 the deviation between the determined control value and the calculated control value is determined and it is checked whether the determined deviation lies within a predefined deviation range.

In order to determine the deviation between the determined control value and the calculated control value, the deviation between these two control values is calculated. In particular, the deviation is calculated according to the following rule:

$$\text{Deviation} = \frac{\text{control value}_{determined}}{\text{control value}_{calculated}}$$

whereby the deviation is the determined deviation, where control value$_{determined}$ is the determined control value, and where control value$_{calculated}$ is the calculated control value.

If the calculated deviation lies within the deviation range, the metering quantity of the operating medium remains unchanged.

If the calculated deviation lies outside of the deviation range, the metering quantity of the operating medium is changed. It is hereby checked, in a next step of the method, whether or not an adaptation of the metering quantity in comparison with the metering quantity in the normal operating mode has already been carried out 11 in a preceding measurement window.

If no adaptation of the metering quantity of the operating medium has taken place yet, the metering quantity is, in a first step, increased in comparison with the metering quantity in the normal operating mode. As a result, an adapted metering quantity is thereafter introduced into the exhaust gas aftertreatment system 5, in particular upstream of the SCR catalytic converter 2.

If an adaptation of the metering quantity of the operating medium has already taken place in a preceding measurement window, in a next step of the method the metering quantity is increased or reduced based on a decision logic 13.

The metering quantity is increased according to the decision logic 13 and NOx slip detected if the calculated deviation of the further measurement window is less than the calculated deviation of the preceding measurement window and the metering quantity in the preceding measurement window has been increased in comparison with the metering quantity in the normal operating mode or in comparison with an already adapted metering quantity.

The metering quantity is reduced according to the decision logic 13 and $NH_3$ slip detected if the calculated deviation of the further measurement window is greater than the calculated deviation of the preceding measurement window and the metering quantity in the preceding measurement window has been increased in comparison with the metering quantity in the normal operating mode or in comparison with an already adapted metering quantity.

The metering quantity is increased according to the decision logic 13 and NOx slip detected if the calculated deviation of the further measurement window is greater than the calculated deviation of the preceding measurement window and the metering quantity in the preceding measurement window has been reduced in comparison with the metering quantity in the normal operating mode or in comparison with an already adapted metering quantity.

In a second variant of the first embodiment, after determining the calculated control value 7 the deviation between the determined control value and the calculated control value is determined and it is checked whether the determined deviation lies within a predefined deviation range.

In order to determine the deviation between the determined control value and the calculated control value, the determined control value and the calculated control value are compared with one another. According to this variant, the metering quantity of the operating medium remains unchanged if the determined control value is less than the calculated control value and as a result the determined deviation lies within a predefined deviation range. Otherwise, the metering quantity of the operating medium is adapted if the determined control value is greater than the calculated control value and as a result the determined deviation lies outside of a predefined deviation range.

In a next step of the method, it is hereby checked whether or not an adaptation of the metering quantity in comparison with the metering quantity in the normal operating mode has already been carried out 11 in a preceding measurement window.

If no adaptation of the metering quantity of the operating medium has taken place yet, the metering quantity is, in a first step, increased in comparison with the metering quantity in the normal operating mode. As a result, an adapted metering quantity is thereafter introduced into the exhaust gas aftertreatment system 5, in particular upstream of the SCR catalytic converter 2.

If an adaptation of the metering quantity of the operating medium has already taken place 11 in a preceding measurement window, in a next step of the method the metering quantity is increased or reduced based on a decision logic 13.

The metering quantity is increased according to the decision logic 13 and NOx slip detected if the further determined control value of the further measurement window is less than the determined control value of the preceding measurement window and the metering quantity in the preceding measurement window has been increased in comparison with the metering quantity in the normal operating mode or in comparison with an already adapted metering quantity.

The metering quantity is reduced according to the decision logic 13 and NH$_3$ slip detected if the further determined control value of the further measurement window is greater than the determined control value of the preceding measurement window and the metering quantity in the preceding measurement window has been increased in comparison with the metering quantity in the normal operating mode or in comparison with an already adapted metering quantity.

The metering quantity is increased according to the decision logic 13 and NH$_3$ slip detected if the further determined control value of the further measurement window is less than the determined control value of the preceding measurement window and the metering quantity in the preceding measurement window has been reduced in comparison with the metering quantity in the normal operating mode or in comparison with an already adapted metering quantity.

In both variants of the first embodiment, the method is to be repeated after the metering quantity has been maintained, increased or has been reduced. For this purpose, on each renewed performance of the method a further measurement window is recorded and a further determined control value and a further calculated control value are determined and the further method steps carried out analogously to the preceding sequence.

As a result it is possible to adjust the metering quantity of operating medium is efficiently as possible.

The effects according to the invention can be achieved through this exemplary configuration.

The invention is not limited to the embodiments described, but comprises any method and any internal combustion engine 1 according to the following claims.

The invention claimed is:

1. A method for improving an efficiency of an SCR system of an exhaust gas aftertreatment system (5) of an internal combustion engine (1), taking into consideration a cross-sensitivity of an NOx sensor to NH$_3$,
    wherein an operating medium is metered upstream of the SCR catalytic converter (2) of the SCR system in a normal operating mode which corresponds to its intended operation,
    wherein the operating medium contains a reducing agent or is converted into the reducing agent,
    wherein the reducing agent is stored at least temporarily in an SCR catalytic converter (2) of the SCR system, comprising the following steps:
    operating the internal combustion engine (1) in the normal operating mode,
    defining a determined control value (6) by way of determining a mass of an exhaust gas component recorded by an NOx sensor (4), which is measured overall at a point in the course of the exhaust gas aftertreatment system (5) during a first measurement window,
    determining a calculated control value (7) by way of calculating the mass of the exhaust gas component, which occurs overall at the point in the course of the exhaust gas aftertreatment system (5) during the first measurement window,
    determining a deviation (8) between the determined control value and the calculated control value,
    checking whether the determined deviation lies within a predefined deviation range,
    adapting the metering quantity of the operating medium when the determined deviation lies outside of the deviation range,
    wherein NOx slip is detected when the determined deviation of the further measurement window is less than the determined deviation of the preceding measurement window and when, in the preceding measurement window, the metering quantity has been increased, in comparison with the metering quantity in the normal operating mode or in comparison with the adapted metering quantity,
    wherein, when NOx slip is detected, the metering quantity of operating medium is increased,
    or that NH$_3$ slip is detected
    when the determined deviation of the further measurement window is greater than the determined deviation of the preceding measurement window and when, in the preceding measurement window, the metering quantity has been increased, in comparison with the metering quantity in the normal operating mode or in comparison with the adapted metering quantity,
    wherein, when NH$_3$ slip is detected, the metering quantity of operating medium is reduced.

2. The method according to claim 1, wherein
    at least one further determined control value is determined during at least one further measurement window, at least one further calculated control value is calculated during the at least one further measurement window,
a deviation between the further determined control value and the further calculated control value is determined,
it is checked whether the determined deviation lies within the predefined deviation range, or another predefined deviation range,
and in that the metering quantity of the operating medium is adapted when the determined deviation lies outside of the deviation range.

3. The method according to claim 1, wherein each of the determined control values is formed from the measured values of the NOx sensor (4) downstream of the SCR system.

4. The method according to claim 1, wherein the reactions, relevant for the method, of the SCR catalytic converter (2), can, in addition to real operation, be calculated in a kinetic model, whereby the kinetic model corresponds to a mathematical model of the physical model of the SCR system used.

5. The method according to claim 1, wherein
each of the calculated control values is calculated with a kinetic model,
or that each of the calculated control values is calculated from a characteristic diagram based on test bench data.

6. The method according to claim 1, wherein the normal operating mode comprises at least one of:
a stationary,
a transient and
a non-stationary operation of at least one of the internal combustion engine (1) and the exhaust gas aftertreatment system (5).

7. The method according to claim 1, wherein
the deviation (8) between the determined control value and the calculated control value is determined according to the following rule:

$$\text{Deviation} = \frac{\text{control value}_{determined}}{\text{control value}_{calculated}}$$

where the deviation is the determined deviation,
where control value$_{determined}$ is the determined control value,
and where control value$_{calculated}$ is the calculated control value.

8. The method according to claim 1, wherein
the deviation (8) is determined through comparison of the determined control value with the calculated control value,
wherein the metering quantity of the operating medium remains unchanged when the determined control value is less than the calculated control value,
and wherein the metering quantity of the operating medium is adapted when the determined control value is greater than the calculated control value.

9. The method according to claim 1, wherein
each measurement window is defined by the reaching of an energy quantity converted by the internal combustion engine (1), wherein each measurement window begins at a starting point and ends at an end point when a particular calculated energy quantity is reached,
or that each measurement window is defined by a duration of a continuously stationary operation of the internal combustion engine (1), wherein each measurement window begins when at least one of:

the internal combustion engine (1) is in stationary operation and ends before the internal combustion engine (1) enters at least one of a non-stationary operation, a transient operation; and
a predefined duration has been reached.

10. The method according to claim 9, wherein
an energy quantity converted by the internal combustion engine (1) is at least one of:
determined from a characteristic diagram of the operating point of the internal combustion engine,
is calculated from a rotational speed of the internal combustion engine, and an injected fuel quantity MfFullnj, and
is calculated according to the following rule:

$$EEng = \int PwrEng$$
$$PwrEng = \frac{2 \cdot \pi \cdot NEng \cdot TqEng}{60 \cdot 1000}$$

where EEng denotes the energy quantity converted by the internal combustion engine (1) during a measurement window,
where PwrEng denotes the engine power,
where NEng denotes the engine speed, and
and where TqEng denotes the engine torque.

11. The method according to claim 1, wherein a validity of each recorded measurement window is evaluated taking into consideration at least one validity parameter.

12. The method according to claim 11, wherein
the measurement window is defined as at least one of:
valid when the at least one validity parameter lies within a validity range for a certain duration during the measurement window, invalid when the at least one validity parameter lies outside of a validity range for a certain duration during the measurement window, and
invalid when a predetermined number of times when the validity range is at least one of exceeded, fallen short of and infringed.

13. The method according to claim 1, wherein
when the determined deviation of the first measurement window lies outside of the deviation range, the metering quantity is increased in comparison with the metering quantity in the normal operating mode, so that an adapted metering quantity is metered thereafter.

14. The method according to claim 1, wherein
NOx slip is detected
when the determined deviation of the further measurement window is greater than the determined deviation of the preceding measurement window and when, in the preceding measurement window, the metering quantity has been reduced, in comparison with the metering quantity in the normal operating mode or in comparison with the adapted metering quantity,
wherein, when NOx slip is detected, the metering quantity of operating medium is increased,
NH$_3$ slip is detected
when the determined deviation of the further measurement window is less than the determined deviation of the preceding measurement window
and when, in the preceding measurement window, the metering quantity has been reduced, in comparison with the metering quantity in the normal operating mode or in comparison with the adapted metering quantity, wherein, when NH$_3$ slip is detected, the metering quantity of operating medium is reduced.

15. The method according to claim 1, wherein

NOx slip is detected when the further determined control value of the further measurement window is less than the determined control value of the preceding measurement window and when, in the preceding measurement window, the metering quantity has been increased, in comparison with the metering quantity in the normal operating mode or in comparison with the adapted metering quantity, wherein, when NOx slip is detected, the metering quantity of operating medium is increased, or that NH$_3$ slip is detected when the further determined control value of the further measurement window is greater than the determined control value of the preceding measurement window and when, in the preceding measurement window, the metering quantity has been increased, in comparison with the metering quantity in the normal operating mode or in comparison with the adapted metering quantity, wherein, when NH$_3$ slip is detected, the metering quantity of operating medium is reduced.

16. The method according to claim 1, wherein

NOx slip is detected when the further determined control value of the further measurement window is greater than the determined control value of the preceding measurement window and when, in the preceding measurement window, the metering quantity has been reduced, in comparison with the metering quantity in the normal operating mode or in comparison with the adapted metering quantity, wherein, when NOx slip is detected, the metering quantity of operating medium is increased, NH$_3$ slip is detected when the further determined control value of the further measurement window is less than the determined control value of the preceding measurement window and when, in the preceding measurement window, the metering quantity has been reduced, in comparison with the metering quantity in the normal operating mode or in comparison with the adapted metering quantity, wherein, when NH$_3$ slip is detected, the metering quantity of operating medium is reduced.

17. The method according to claim 1, wherein the metering quantity is adapted by an adaptation factor, wherein the adaptation factor is a predefined value, or wherein the adaptation factor is dependent on the determined deviation.

18. An internal combustion engine (1) comprising an exhaust gas aftertreatment system (5) with an SCR system, wherein the internal combustion engine (1) is configured to carry out a method for improving an efficiency of the SCR system of the exhaust gas aftertreatment system (5) of the internal combustion engine (1), taking into consideration a cross-sensitivity of an NOx sensor to NH$_3$, wherein an operating medium is metered upstream of the SCR catalytic converter (2) of the SCR system in a normal operating mode which corresponds to its intended operation, wherein the operating medium contains a reducing agent or is converted into a reducing agent, wherein the reducing agent is stored at least temporarily in an SCR catalytic converter (2) of the SCR system, comprising the following steps:

operating the internal combustion engine (1) in the normal operating mode, defining a determined control value (6) by way of determining a mass of an exhaust gas component recorded by an NOx sensor (4), which is measured overall at a point in the course of the exhaust gas aftertreatment system (5) during a first measurement window, determining a calculated control value (7) by way of calculating the mass of the exhaust gas component which occurs overall at the point in the course of the exhaust gas aftertreatment system (5) during the first measurement window, determining a deviation (8) between the determined control value and the calculated control value, checking whether the determined deviation lies within a predefined deviation range, adapting the metering quantity of the operating medium when the determined deviation lies outside of the deviation range, wherein NOx slip is detected when the determined deviation of the further measurement window is less than the determined deviation of the preceding measurement window and when, in the preceding measurement window, the metering quantity has been increased, in comparison with the metering quantity in the normal operating mode or in comparison with the adapted metering quantity, wherein, when NOx slip is detected, the metering quantity of operating medium is increased, or that NH$_3$ slip is detected when the determined deviation of the further measurement window is greater than the determined deviation of the preceding measurement window and when, in the preceding measurement window, the metering quantity has been increased, in comparison with the metering quantity in the normal operating mode or in comparison with the adapted metering quantity, wherein, when NH$_3$ slip is detected, the metering quantity of operating medium is reduced.

* * * * *